United States Patent
Nickolas et al.

(10) Patent No.: US 6,855,358 B1
(45) Date of Patent: Feb. 15, 2005

(54) PROCESS FOR ADDITION OF A NUTRACEUTICAL TO A BEVERAGE

(75) Inventors: Steve Nickolas, Scottsdale, AZ (US); Andrew Stewart, Ontario (CA)

(73) Assignee: Enhanced Beverages, LLC, Scottsdale, AZ (US)

( * ) Notice: Subject to any disclaimer, the term of this patent is extended or adjusted under 35 U.S.C. 154(b) by 0 days.

(21) Appl. No.: 10/286,345

(22) Filed: Nov. 1, 2002

(51) Int. Cl.$^7$ .............................. A23B 4/24; A23L 2/44
(52) U.S. Cl. ...................... 426/335; 426/312; 426/316; 426/320; 426/321; 426/324; 426/590
(58) Field of Search .................................. 426/316, 312, 426/320, 321, 324, 335

(56) References Cited

U.S. PATENT DOCUMENTS

| | | | |
|---|---|---|---|
| 4,325,975 A | | 4/1982 | Lindon et al. |
| 4,849,237 A | * | 7/1989 | Hurst ........................ 426/332 |
| 5,403,602 A | * | 4/1995 | Endico ....................... 426/231 |
| 5,786,006 A | | 7/1998 | Lindon et al. |
| 5,804,596 A | * | 9/1998 | Majeed et al. .............. 514/455 |
| 5,863,939 A | | 1/1999 | Pischel et al. |
| 5,950,435 A | | 9/1999 | Kaizuka |
| 5,965,181 A | | 10/1999 | Barkalow et al. |
| 6,465,018 B1 | | 10/2002 | Tuttle |
| 6,479,069 B1 | | 11/2002 | Hamilton |

* cited by examiner

*Primary Examiner*—Helen Pratt
(74) *Attorney, Agent, or Firm*—TraskBritt

(57) ABSTRACT

The present invention discloses a method of introducing a nutraceutical to a beverage comprising treating a beverage with a primary sterilizing agent, such as ozonation, filling a container with said beverage, adding an amount of a nutraceutical and sealing said container. The present invention allows for the production of a suitably sterile beverage without a substantial loss in the activity, or change in the structure, of a nutraceutical.

4 Claims, 1 Drawing Sheet

PROCESS FOR ADDITION OF A NUTRACEUTICAL TO A BEVERAGE

CROSS-REFERENCE TO RELATED APPLICATION

A preferred nutraceutical enhanced aqueous liquid is disclosed in U.S. patent application Ser. No. 10/286,352, filed Nov. 1, 2002, the content of said application being incorporated herein by reference.

BACKGROUND OF THE INVENTION

1. Field of Invention

The present invention relates to comestive drinks which are aqueous based and incorporate a health-benefiting composition.

2. State of the Art

Current health drinks such as Gatoraid®, a trademark of Stokely-Van Camp, Inc., and similar drinks are directed to providing electrolytes and other ingredients, which include caloric-providing compositions as well. The art, however, is devoid of aqueous based drinks, which provide a caloric neutral content while providing excellent hydration.

Currently most bottled water and many beverage manufactures utilize ozonation as a primary means of treating and sanitizing the beverage. Ozone is an excellent choice for this application due to the non-selective oxidizing ability. Other treatments are known in the art including, chlorination, irradiation, ultraviolet light, heat, pH extremes, filtration and others. These treatments all pose a significant challenge to the incorporation of a sensitive ingredient into the aqueous liquid in as much as degradation of a sensitive ingredient, from oxidation or other treatments, would occur. Prior processes therefore lacked the ability to sanitize the liquid and its container while maintaining the integrity of sensitive ingredients such as nutraceuticals.

Manufacturers of bottled beverages have focused on sterilization of the product, for extended shelf life, as a single stage event, where all of the components of the beverage are assembled into an aqueous liquid and treated so as to sterilize the beverage and the container into which it is placed. Because of the unified treatment the method of sterilization must be compatible with all of the individual ingredients and components. This unified treatment results in challenging, and sometimes insurmountable, barriers to the selection of an appropriate primary sterilization agent or method. Thus, current methods do not allow for the suitably sterile introduction of sensitive components into a bottled beverage that retains an acceptable shelf-stability.

BRIEF SUMMARY OF THE INVENTION

The present invention relates to adding a nutraceutical to a container after introduction of a sterilized aqueous liquid and immediately prior to sealing the container. Nutraceuticals, which are health-related ingredients of various types and may include pharmaceuticals, are examples of substances that are desirable to introduce into packaged beverages for a variety of purposes. The present invention allows nutraceuticals, and other sensitive materials, to be introduced into the beverage while retaining sterility and minimizing loss of activity.

In one embodiment the nutraceutical is prepared as an at least partially sterile syrup and added to the aqueous liquid prior to sealing the container.

In another embodiment the nutraceutical is prepared as an at least partially sterile shelf-stable syrup.

In another embodiment the nutraceutical is added to an aqueous liquid filled container, wherein the aqueous liquid has been previously treated with a primary sterilizing agent, e.g. ozone.

In another embodiment the nutraceutical is added post filling of the container with ozonated water.

In another embodiment a method of adding a nutraceutical to an aqueous liquid to form a shelf-stable beverage comprising treating said aqueous liquid with a primary sterilizing agent, filling a container with said aqueous liquid, adding said nutraceutical and sealing said container is provided.

In another embodiment a method of adding a nutraceutical to an aqueous liquid to form a shelf-stable beverage is provided. The method comprises ozonating at least a part of said aqueous liquid to form an ozonated aqueous liquid, providing a container having an internal volume at least equal to a nutraceutical volume and an aqueous liquid volume, said container including a sealable opening communicating with said internal volume, adding said ozonated aqueous liquid to said container in the amount of said aqueous liquid volume, adding a nutraceutical to said container in the amount of said nutraceutical volume and sealing said sealable opening of said container.

The present invention relates to the addition of a nutraceutical to an aqueous liquid without degradation of the nutraceutical. The end product of such a process is a beverage enhanced with a nutraceutical in a suitably sterile, shelf-stable, container or package. The present invention provides a method of adding a nutraceutical to an aqueous liquid to form a shelf-stable beverage comprising treating said aqueous liquid with a primary sterilizing agent, filling a container with said treated aqueous liquid, adding said nutraceutical to said container and sealing said container.

BRIEF DESCRIPTION OF THE DRAWINGS

The above-mentioned features and advantages of this invention, and others related thereto, as well as the manner of attaining them, will become more apparent and the invention will be better understood by reference to the following description of an embodiment of the invention taken in conjunction with the accompanying drawing, wherein.

Figure 1:
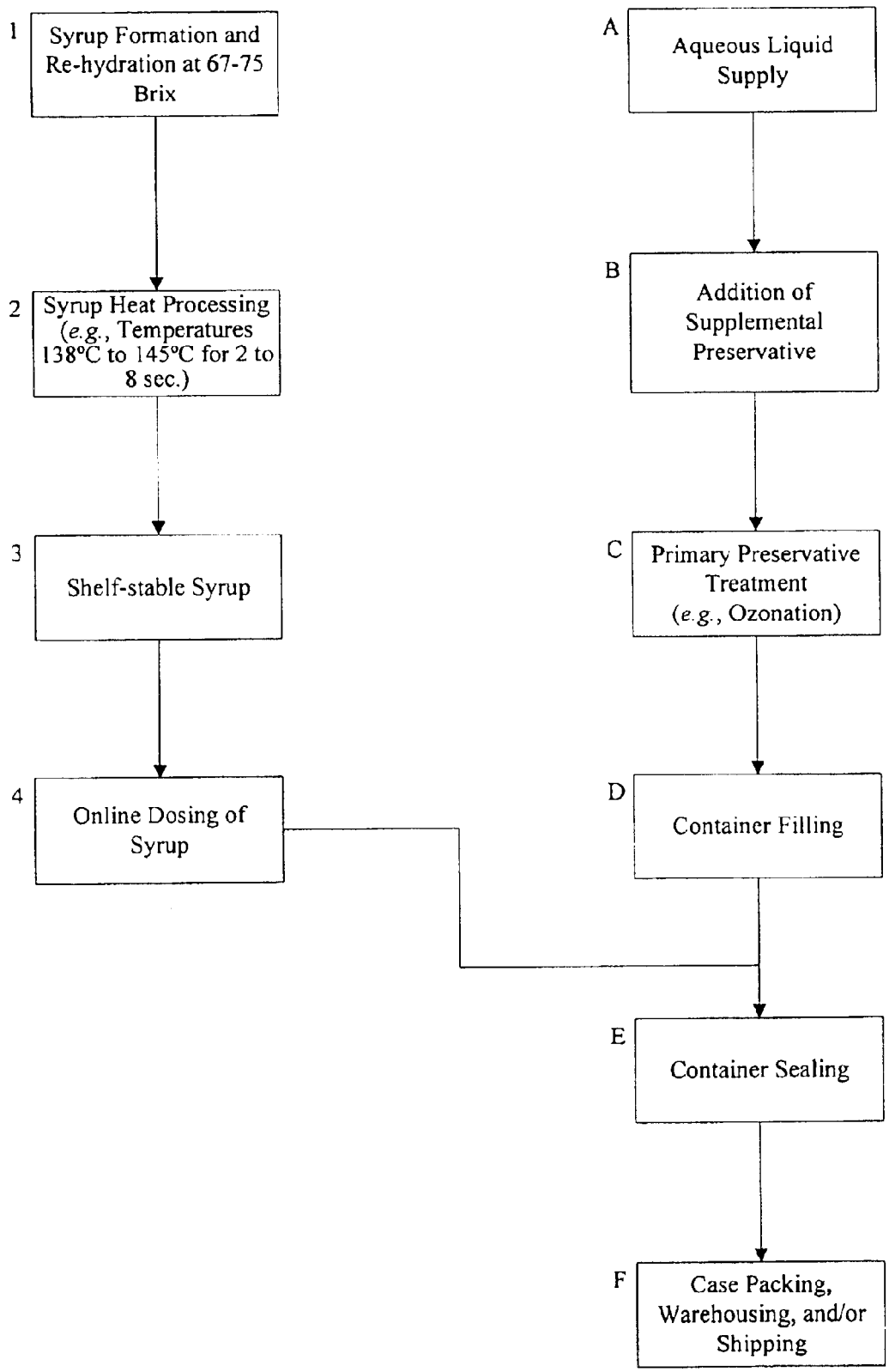
FIG. 1 is a flow chart showing an embodiment of the invention.

The exemplification set out herein illustrates one embodiment of the invention, in one form, and such exemplification is not to be construed as limiting the scope of the invention in any manner.

DETAILED DESCRIPTION OF THE INVENTION

As used herein the term aqueous liquid means any liquid having a significant water content. The aqueous liquid may contain additional ingredients without deviating from the meaning of aqueous liquid as used herein.

As used herein the term beverage means a consumer ready product comprising any liquid intended for human or animal consumption.

As used herein the term bottled or bottling means a beverage introduced or being introduced into any suitable container. The phrase bottled beverage is used merely as an example of one type of container.

As used herein the term brix means a hydrometer scale for solutions indicating the percentage by weight of a dissolved solid or by volume of an added liquid.

As used herein the term container means any suitable packaging apparatus including, but not limited to, glass and plastic bottles, glass and plastic jars, liquid compatible paper cartons, metal cans and drums, or any other receptacle fit for the retention of aqueous liquid. Containers may be of any appropriate or desirable size.

As used herein the term nutraceutical means a natural or synthesized substance that provides at least a perceived health or medical benefit.

As used herein the term sterilizing agent means a substance having an effect on product safety, stability and shelf-life, including an antiseptic effect.

As used herein the term weight or dry weight means the mass of a substance, or a group of substances each of which is a subset of the set defined by the substance name, times the magnitude of the acceleration due to gravity, as determined for the substance in any powdered state.

The present invention relates to the addition of a nutraceutical to an aqueous liquid without degradation of the nutraceutical. The end product of such a process is a beverage enhanced with a nutraceutical in a suitably sterile, shelf-stable, container or package. The present invention provides a method of adding a nutraceutical to an aqueous liquid to form a shelf-stable beverage comprising treating said aqueous liquid with a primary sterilizing agent, filling a container with said treated aqueous liquid, adding said nutraceutical to said container and sealing said container.

To minimize the degradation of the nutraceutical, the nutraceutical is preferably administered post filling of the container and immediately prior to sealing. In one example of the present invention, ozone, a strong sterilizing agent, but one which has a short half-life, is used as the primary sterilizing agent to obtain the oxidative action of ozone on the aqueous liquid and packaging material wherein the addition of the nutraceutical is delayed to minimize the oxidative effect on the nutraceutical.

EXAMPLE 1

Forskohlin, Hydroxycitric acid and Fructooligosaccharides are added to a liquid medium, which is partially composed of water, to a final concentration of 67 to 75 Brix by weight to form a syrup as in FIG. 1(1). The Forskohlin, Hydroxycitric acid and Fructooligosaccharides may be added in a ratio of three grams of Hydroxycitric acid for every gram of Forskohlin and ten grams of Fructooligosaccharides for every gram of Forskohlin. The syrup is then heated to a temperature between 138° C. and 145° C., using a heat exchanger constructed in a shell and tube design with reverse flow, for a period of about 2 to 8 seconds as in FIG. 1(2), to produce a shelf-stable syrup as contemplated in FIG. 1(3). Other suitable methods for heating the syrup to similar uniform temperatures may be utilized.

A Brix concentration of about 67 or greater results in a syrup that is naturally resistant to microbial growth. The additional heat treatment results in additional sterility and an increase in the shelf-life. One of the benefits derived from the heat treatment of the syrup is the generation of a concentrated nutraceutical liquid composition that can be stored. In addition, the concentrated nutraceutical syrup, when added later to a beverage filled container, does not result in undesirable microbial contamination. Addition of a microbial load contained in the syrup would require additional primary sterilizing activity to counter the increased load. Increased primary sterilizing activity remaining after the addition of the nutraceutical would result in increased degradation of the nutraceutical. Thus, the heat treatment provides a benefit that can be readily utilized where desirable and appropriate.

Forming a shelf-stable nutraceutical containing syrup permits the syrup to be prepared in one location, then shipped to a second location for further processing into a shelf-stable nutraceutical containing beverage.

Purified water, as contemplated in FIG. 1(A), may be, but is not limited to, natural spring water or purified water. Purified water is known in the art, and usually generated by deionization followed by filtration or reverse osmosis. In one embodiment, purified water is utilized so as to reduce the dissolved solid content and to prevent precipitation of various salts.

A supplemental sterilizing agent, such as minimal, but effective, quantities of a copper salt, may be added to the purified water as contemplated in FIG. 1(B). A supplemental sterilizing agent such as a copper salt or the like is generally either a bacteriostat, which inhibits microbial growth, or a bacteriocide. Thus, addition of the supplemental sterilizing agent prevents or slows the growth of any microorganism within the product. One aspect of the secondary sterilizing agent is to prevent the growth of spores or other sources of microbial growth that escape sanitization by the primary sterilizing agent.

The aqueous liquid may then be treated with a primary sterilizing agent, such as ozonation, as contemplated in FIG. 1(C). Ozone is added to the pre-chilled beverage at a dose of about 0.2–0.4 mg/L. The temperature of the aqueous liquid at the time of addition of the ozone affects the duration of oxidative activity. Preferably, the ozone is added to a beverage that has been cooled to a temperature of 10° C. or less. Addition of ozone at higher temperatures also results in increased loss of the ozone to the surrounding atmosphere. Thus, the temperature of the beverage at the time of ozonation will affect the time allowable for addition of the nutraceutical and sealing of the container.

The ozonated aqueous liquid is then added to an appropriate container as contemplated in FIG. 1(D). Following the addition of the ozonated aqueous liquid, the nutraceutical, preferably in the form of a shelf-stable syrup, is added to the ozonated aqueous liquid filled container, for example between FIGS. 1(D) and (E). The container is then sealed and can be further packaged and/or treated in preparation for shipment. See FIG. 1(F).

The time from addition of the ozonated aqueous liquid to a container, through the process of adding the nutraceutical, to the sealing of the package may be referred to as the handling time. Where appropriate and desirable the handling time most effective for a given set of conditions may be altered by changing the amount of the primary sterilizing agent, the temperature of the beverage, the dissolved solid content of the beverage or the like.

If criteria exist requiring any dilution in effect of residual ozone on the nutraceutical composition, an appropriate amount of a strong antioxidant such as vitamin C (as ascorbic acid) or vitamin E (α-tocopherol) or the like can be added to neutralize any excess residual ozone or free oxygen. Such antioxidants not only rapidly react with oxygen, but are generally considered as healthy nutritional supplements. It may be desirable to allow a small amount of residual ozone to remain in the beverage to continue its sanitizing effect.

The present invention results in the production of a sterile product without any significant loss of nutraceutical activity that has been associated with processes which include addition of a sensitive ingredient to a beverage prior to treatment with ozone. Addition of a sufficiently shelf-stable nutraceutical syrup after addition of the ozonated beverage to the container results in sterilization of the container and sufficient residual ozone (oxidative activity) to sterilize the sealing mechanism and any previously exposed surfaces. However, there is not sufficient ozone activity to substantially reduce the activity, or change the structure, of the nutraceutical.

Addition of a nutraceutical requires an effective method of dissolving, stabilizing, adding, and maintaining the integrity of the ingredients used to fortify the finished product. One preferred embodiment utilizes a syrup concentrate inhospitable to microbial growth having the nutraceutical therein. See FIG. 1(1). The syrup may be treated by way of high heat processing, for example to increase product safety and shelf stability. See FIG. 1(2). Development of a nutraceutical syrup concentrate also enables, at the bottling stage, a greater ease of incorporation that is both uniform and accurate relative to proper dosage levels in the finished product.

EXAMPLE 2

A supplemental sterilizing agent, such as a copper salt, may be added to the aqueous liquid of Example 1. A supplemental sterilizing agent such as a copper salt or the like is either a bacteriostat, which inhibits microbial growth, or a bacterioside. Thus, addition of the supplemental sterilizing agent prevents or slows the growth of any organism within the product. One aspect of the secondary sterilizing agent is to prevent the growth of spores or other sources of microbial growth that escape the primary sterilizing agent. Addition of a supplemental or secondary sterilizing agent, such as a copper salt, reduces the amount of primary sterilizing agent necessary to produce a shelf-stable aqueous beverage. Spores or microorganisms surviving the primary sterilizing agent are inhibited or killed by the secondary sterilizing agent, which is added to the beverage in an amount effective to prevent or inhibit the microorganisms.

In this embodiment, the nutraceutical activity is further preserved by the toxic effect of the copper ions on potential microorganisms. In addition, the copper ions provide a nutritional factor to humans and animals. Addition of an effective amount of a copper salt, such as cupric sulfate, cuprobam, cuprous iodide, or the like, reduces the necessary concentration of primary sterilizing agent. For example, addition of copper in a range of about 0.25 to about 0.5 mg/L provides sufficient sterilizing activity to allow the use of ozone in a range of about 0.2 to about 0.4 mg/L during a cold filling process. This process allows for the production of a shelf-stable beverage, with minimal degradation to the sensitive nutraceuticals.

To produce a nutraceutical concentrate or syrup, at least one nutraceutical is added to a liquid medium up to a concentration of about 45 to 95 Brix, preferably about 60–80 Brix, more preferably about 65–75 Brix, and most preferably about 67 Brix, hereinafter the "syrup." Where desirable and appropriate, the syrup is treated by high heat processing, wherein the syrup is heated to a temperature above 100° C., more preferably between 130 and 150° C., or even more preferably between 138 to 145° C. for a sufficient time to achieve a substantially uniform temperature throughout the syrup. The temperature is should be sufficient to kill or shock undesirable microorganisms without adversely affecting the nutraceutical. Where desirable and appropriate, the syrup is heated for a period of between about 0.1 to about 300 seconds, more preferably, about 2 to about 8 seconds and most preferably about 2 seconds. Heating of the syrup may be accomplished by any methods known to a person of skill in the art, for example, by use of a heat exchange such as a shell and tube design with a reverse flow. A shelf-stable syrup that is preferably aseptic and poses minimal contamination risk for subsequent processing is achieved by this method.

Syrups of about 85 Brix or greater may result in increased viscosity of the syrup. The increase in viscosity may affect pumping and the time/temperature relationship of the heat treatment. The increased viscosity maybe addressed by use of alternative pumping systems known in the art, such as a systolic pump. The time/temperature relationship required to produce the desired shelf-stable syrup may be adjusted as appropriate and desirable. Factors to be considered include the microbial load of the finished product, the microbial load of the resultant syrup, the dissolved solids content of the syrup, heat damage to the compounds comprising the syrup, and changes in color and taste.

The shelf-stable syrup may be produced and used at the same location, or produced in one location and shipped to the bottling facility in a different location. In addition, shipment of a concentrated syrup is considerably more economical than shipping the finished beverage long distances. The shelf-stable syrup subjected to high temperature processing may remain sterile for up to 18 months. Without the formation of a concentrated syrup, with or without high temperature processing maintenance of sterility is impractical at best.

In another embodiment, at least one nutraceutical is prepared as a sterile powder. The powder may be introduced into the aqueous liquid in powdered form. Alternatively, the nutraceutical may be prepared initially in a separate liquid and introduced into the aqueous liquid or used to produce the syrup. To produce the syrup starting with one or more nutraceuticals in liquid form, the nutraceutical may be concentrated by methods known in the art prior to addition to the fluid medium, or, where appropriate, the liquid nutraceutical may be the initial liquid medium to which additional nutraceuticals are added where appropriate and desirable.

A nutraceutical syrup, powder, solution or liquid may be prepared and/or utilized in either a batch process or a continuous process. As will be recognized by a person of ordinary skill in the art addition of dry compounds and other formulations may be utilized in any combination desired. Where the dry compounds or composition are dissolve in a liquid, this process may be augmented by methods known in the art, including heating, physical agitation, or the like.

The purified water, or the aqueous liquid, may be treated with a primary sterilizing agent, such as ozonation. Ozone is added to the pre-chilled beverage at a dose of about 0.2–3 mg/L or about 0.2–0.4 mg/L. The temperature of the beverage at the time of addition of the ozone affects the duration of oxidative activity. Preferably, the ozone is added to a beverage that has been cooled to a temperature of 10° C. or less. Addition of ozone at higher temperatures results in increased loss of the ozone to the surrounding atmosphere. At temperatures above 10° C. ozone is lost to the atmosphere at a rate exponentially related to the temperature. Thus, the temperature of the beverage at the time of ozonation will affect the appropriate handling time. Addition of 0.2–0.4 mg/L of ozone to an aqueous liquid, chilled to a temperature of about 10° C., yields an ozonated aqueous liquid which will continue to liberate sufficient ozone for several minutes. Adding the ozonated aqueous liquid to a container within this time allows the liberated ozone to improve sterilization of the containers head space.

A nutraceutical may be composed of any compound, or combinations thereof, so as to produce a perceived beneficial effect. Examples of such compounds include, but are not limited to; 7β-acetoxy-8,13-epoxy-1α, 6β, 9α-trihydroxylabd-14-en11-one, Forskholin (see U.S. Pat. No. 5,804,596, sold under the trademark FORSLEAN®), hydroxycitric acid and salts thereof (see U.S. Pat. No. 5,783,603, sold under the trademark CITRIN®-K), fructooligosaccharides (such as those sold under the trademark NUTRAFLORA®), glucomanan, chromium picolinate, garcinia cambogia, garcinia cambogia, chitosan, steroidal glycosides, Gymnema Sylvestre; Kola Nut; Citrus Aurantium; Yerba Mate; Griffonia Simplicifolia, guar gum, a plant extract derived from the group comprising the genus Trichocaulon and the genus $Hoodia$ and having appetite suppressant activity, 3-0-[-β-D-thevetopyranosyl-(1→4)-β-D-cymaropyranosyl-(1→4)-β-D-cymaropyranosyl]-12β-0-tigloyloxy-14-hydroxy-14β-pregn-50-en-20-one ($C_{47}H_{74}O_{15}$ $M^+$878) (See European Patent application EP 1 222 927), any herb, any herb extract, and any pharmaceutical. The nutraceutical formed with an effective amount of one or more of above may be combined with additional nutraceuticals, pharmaceuticals, carriers, or other ingredients to produce a desired benefit or to produce multiple or combinatorial benefits. Examples of other ingredients include, but are not limited to, vitamins, natural and artificial flavors, electrolytes, dietary fiber, calcium, iron, zinc, calcium disodium EDTA, citric acid, $CO_2$ or any other desired ingredient.

Without being bound by any theory, a fructooligosaccharide, including short-chain fructooligosaccharides, is a prebiotic found in many fruits, vegetables and grains. However, the amount of fructooligosaccharides found in fruits, vegetables and grains frequently render it impractical for a person to consume enough biomass of the fruits, vegetables and grains to effectively achieve the desired health benefits. The present invention may utilize an effective amount of fructooligosaccharides prepared in a more concentrated form to achieve the desired health related result. Literature related to the health benefits of fructooligosaccharides include: Hidaka, et al., Effects of Fructooligosaccharides on Intestinal Flora and Human Health, Bifidobacteria Microflora, 5(1), 37–50, (1986); Buddington, et al., Dietary supplement of neosugar alters the fecal flora and decreases activities of some reductive enzymes in human subjects, American Journal of Clinical Nutrition, 63:709–716, (1996); Alm, The effect of Lactobacillus acidophilus administration upon the survival of Salmonella in randomly selected human carriers, Progress in food and Nutrition Science, 7:13–17, 1983; and Buddington et al., Am. J. Clin. Nutr. 63: 709–16, (1996).

Without being bound by any theory, Forskolin, deacetylforskolin, 9-deoxyforskolin, 1,9-deoxyforskolin, 1,9-dideoxy-7-deacetylforskolin are diterpenoid compounds, which are reported in U.S. Pat. No. 5,804,596 to activate adenylate cyclase to reduce body fat and restore monoamine levels to provide an anti-depressant effect. See Tandon, J. S. et al., Ind. J. Chem., 15B:880–883 (1977); Gabetta. B., et al., Minor diterpenoids of $Coleus forskohlii$ Phytochemistry, 28(3):859–862 (1989); Okuda H, et al., Relationship between cyclic AMP production and lipolysis induced by forskolin in rat fat cells, J Lipid Res, 33(2): 225–31 (1992).

Potassium hydroxycitrate is reported in U.S. Pat. No. 5,783,603 to decrease body weight by increasing the body's consumption of fat and decreasing the liver's s rate of gluconeogenesis.

Chromium picolinate is an organic compound of trivalent chromium and picolinate acid, reported in the literature to possess fat burning properties.

Garcinia cambogia is an herbal component which is reported to inhibit lipogenesis, lower the production of cholesterol and fatty acids, increase the production of glycogen in the liver thereby suppressing appetite, and increasing the body's production of heat by activating the process of thermogenesis.

Glucomanan is a natural dietary, calorie-free, high fiber powder, obtained from the root of amorphophallus konjac, with the reported property of being an appetite suppressant due to the fact that it may absorb up to fifty times its weight in liquid.

Guar gum, otherwise known as Cyamopsis Tetragonoloba, is a water soluble polymer extracted from guar seeds. Guar gum has found use in slimming aids, nutritional foods, and water soluble dietary fiber formulations. Guar gum, a galactomannan polysaccharide, and other gel-forming fibers such as psyllium hydrophilic mucilloid, have been recognized to have a therapeutic value for lowering cholesterol and helping to regulate blood sugar. The cholesterol-lowering properties of guar gum and other mucilaginous substances were initially recognized by Fahrenbach et al. (U.S. Pat. No. 3,148,144).

Chitosan is a fiber composed of chitin, which is a component of the exoskeleton of shellfish. Without being bound by any theory, chitin may be processed so that it has a high binding, that is, absorption, affinity for fat and cholesterol within the digestive tract. Fibers such as chitosan prepared so as to have high binding affinity are reported to absorb many times their weight of fat and cholesterol.

Forskohlin is reported to be insoluble in water. The present invention uses an advanced water soluble formulation of forskohlin. The water solubility allows the present invention to combine the fat burning potential of forskohlin with the appetite suppression of Hydroxycitric acid and the carbohydrate uptake inhibition of fructoologosaccharides. The combined effect of Forskohlin, Hydroxycitric acid and fructoologosaccharides provides a nutraceutical with significant impact on body mass. The novel combination of ingredients provides a multifaceted approach to weight reduction not found in similar products.

Forskohlin, as a liquid or solid, may be mixed with Hydroxycitric acid and/or CITRIN®, as a liquid or solid, by any method so as to produce a ratio of Forskohlin to Hydroxycitric acid. The ratio of Forskohlin to Hydroxycitric acid can be varied from 5:1 to 1:80, including about 1:1, about 1:3, about 1:4 and about 1:10. One embodiment utilizes a ratio of about one gram of Forskohlin to about 3 grams of Hydroxycitric acid and/or CITRIN®. Forskohlin, as a liquid or solid, may be mixed with fructo-oligosaccharides, as a liquid or solid, by any method so as to produce a ratio of Forskohlin to fructo-oligosaccharides. The ratio of Forskohlin to fructo-oligosaccharides can be varied from 2:1 to 1:200, including about 1:1, about 1:4 and about 1:15. One embodiment utilizes a ratio of about one gram of Forskohlin to about 10 grams of fructo-oligosaccharides. Hydroxycitric acid, as a liquid or solid, may be mixed with fructo-oligosaccharides, as a liquid or solid, by any method so as to produce a ratio of Hydroxycitric acid to fructo-oligosaccharides. The ratio of Hydroxycitric acid to fructo-oligosaccharides can be varied from 8:1 to 1:50, including about 1:3, about 1:2, about 1:5. The ratios expressed in this paragraph reflect the relative dry weights of the compounds. The compounds may be mixed at any point in time. For example, the compounds may be premixed in dry form and stored for later use.

An effective amount is a quantity of one or more of the compounds wherein an average adult would experience the health benefits of the compounds. The health benefits include appetite suppression, effecting the intestinal flora, promotion of lean body mass, anti-depressant effects and reduced body fat.

In a preferred embodiment, the nutraceutical is added to produce a beverage comprising non-flavored water. The composition was selected to provide the perceived health benefits without adversely affecting the perceived taste, color or clarity of water. Therefore, the composition plus water has the taste and appearance of water. In one embodiment of a non-flavored water Forskohlin is added to a final concentration of about 100 mg/L (±10%), Hydroxycitric acid and/or CITRIN® is added to a final concentration of about 300 mg/L (±10%), and fructo-oligosaccharides are added to a final concentration of about 1 g/L (±10%). In this embodiment the ratio of Forskohlin to Hydroxycitric acid is about 1:3 and the ratio of Forskohlin to fructo-oligosaccharides is about 1:10. Where desired and appropriate, other products having no perceived effect on the taste, color or clarity of the water may be added. Thus, the composition is formulated to allow the nutraceutical plus water to retain the clarity, taste, appearance, and re-hydration properties of purified water, while having the benefit of the added composition.

Following the addition of the treated aqueous liquid to the container the nutraceutical may be added to the aqueous liquid filled container and the container then rapidly sealed. The aqueous liquid may be chilled or heated, as appropriate, either prior to or following addition of the primary sterilizing agent. A person of ordinary skill in the art may adjust the temperature of the aqueous liquid in any manner appropriate to achieve the desired effect. In one embodiment ozone is used as the primary sterilizing agent and added to purified water. The aqueous liquid, e.g., water, may be chilled prior to the addition of the ozone or subsequently. Chilling of the ozonated aqueous liquid predictably stabilizes the ozone, allowing for prolonged activity. Preferably, addition of the nutraceutical and the sealing of the container are accomplished in under five minutes, more preferably in under two minutes, and most preferably in under one minute.

An aqueous liquid is prepared by methods known in the art and processed such that it is substantially prepared for bottling. The aqueous liquid may contain any other ingredients so as to produce a desired benefit, flavor or effect. Examples of other ingredients include, but are not limited to, vitamins, natural and artificial flavors, electrolytes, dietary fiber, calcium, iron, zinc, calcium disodium EDTA, citric acid, $CO_2$ or any other desired ingredient. The aqueous liquid is treated with a primary sterilizing agent including, but not limited to, filtration, ozonation, chlorination, peroxide treatment, treatment with Ultraviolet light, irradiation, pH extremes, dimethyl dicarbonate (sold under the trademark VELCORIN®, see U.S. Patent No.), K-sorbate and/or Na-benzoate with ascorbic acid and dimethyl dicarbonate (see U.S. Pat. No. 5,866,182) or other known antiseptic or sterilizing agents or methods.

Changes in pH, produced by $CO_2$ or other ingredients, may result in changes to the color and flavor of the beverage. For example, addition of carbon dioxide to an aqueous liquid results in a decrease in the pH of the liquid. It is known in the art that pH can produce perceived flavors. For example, a strongly basic solution may result in the perception of a "salty" taste. Where appropriate and desirable the pH of the nutraceutical or beverage may be adjusted so as to produce an aseptic product. Where the beverage is primarily water, significant changes in the pH may result in undesirable changes to the flavor of the beverage.

Addition of the primary sterilizing agent, preferably ozone, to the aqueous liquid is accomplished by any of the methods and apparatus known in the art. The primary sterilizing agent serves to appropriately sterilize the aqueous liquid and receiving container at the time of filling. In addition, the primary sterilizing agent preferably does not sufficiently adversely affect the perceived flavor and appearance of the beverage. Preferably the sterilizing agent retains sufficient activity to sterilize the sealing mechanism. Even more preferably, the sterilizing agent does not retain sufficient activity to detrimentally affect the structure or activity of the nutraceutical following sealing of the container.

The effect of the sterilizing agent may be assayed by methods known in the art. For example, High pressure liquid chromatograph (HPLC) may be used to assay for loss of structure. Comparison of the peak area prior to treatment and after sterilization allows for the calculation of loss. Alternatively, functional assays may be performed to determine loss of activity.

When the primary sterilizing agent is ozonation, ozone may be added to a concentration of about 0.01 to 3 mg/L of aqueous liquid. Preferably, ozone is added to an initial concentration of about 0.1 to 1 mg/L, more preferably 0.2 to 0.4 mg/L. Ozone may be added to any desired concentration so as to achieve the desired results. The duration and amount (intensity, etc.) of primary sterilizing agent necessary to achieve the desired sterilization in any particular aqueous liquid, without significant loss to the nutraceutical's activity, may be determined by methods and procedures including HPLC, TLC, ion exchange chromatography, size exclusion, bioassays, or the like. Secondary or supplemental sterilizing agents may be added to such that the duration and amount of the primary sterilizing agent may be reduced. Addition of a secondary sterilizing agent, such as cupric sulfate, cuprobam, cuprous iodide, or the like, reduces the necessary concentration of primary sterilizing agent. For example, addition of copper in a range of about 0.25 to about 0.5 mg/L provides sufficient sterilizing activity to allow the use of ozone in a range of about 0.2 to about 0.4 mg/L during a cold filling process. This process allows for the production of a shelf-stable beverage, with minimal degradation to the sensitive nutraceuticals.

The terms "primary sterilizing agent" and "supplemental sterilizing agent" do not refer to a temporal relationship. Rather, the primary sterilizing agent refers to a substantial participation in the production of a shelf-stable beverage filled container.

When the beverage is non-flavored purified water, the taste and clarity of purified water are retained.

In another embodiment an effective amount of a supplemental or secondary sterilizing agent is added to the aqueous liquid or nutraceutical to further reduce or inhibit undesirable products, including, but not limited to, fungal, bacterial, and other microorganisms. The supplemental sterilizing agent may be added to the aqueous liquid prior to treatment with ozone or at any time prior to sealing of the container. The supplemental sterilizing agent preferably does not substantially adversely affect the activity of the nutraceutical or affect the desired taste and flavor of the beverage. Examples of supplemental sterilizing agents include, but are not limited to, various organic and inorganic copper compounds, e.g.; cupric acetate, cupric citrate, cupric gluconate, cupric glycinate, cupric sulfate, cuprous sulfate, cuprous oxide, chelates of copper, and the like, as well as iron and zinc compounds such as, ferric hydroxide, iron salts, zinc acetate, zinc carbonate, zinc chloride, zinc citrate, zinc permanganate, dimethyl dicarbonate (sold under the trademark VELCORIN®, see U.S. Patent No.), K-sorbate and/or Na-benzoate with ascorbic acid and dimethyl dicarbonate (see U.S. Pat. No. 5,866,182), quinolone carboxylic acids (see U.S. Pat. No. 4,559,341), or any other appropriate preservative. Addition of a supplemental or secondary sterilizing agent reduces the sterilization demand on the primary sterilizing agent, for example, allowing use of the primary sterilizing agent at lower concentrations.

Where appropriate and desirable the container may be sterilized prior to filling with the aqueous liquid. Preferably the container is reasonably sterile prior to filling and further sterilized upon filling with the aqueous liquid containing the primary sterilizing agent.

The nutraceutical may be added to the beverage or aqueous liquid filled container by any method known in the art. Preferably, the nutraceutical is added to the beverage filled container by a peristaltic pump or other metering dispensing device, which allows for a measured quantity of the nutraceutical to be added to each container. Such measuring device may be constructed so as to minimize exposure of the concentrate and the aqueous liquid filled container to possible contamination.

Sufficient nutraceutical may be added to an aqueous liquid filled container to achieve the desired final concentration, for example, 0.002%, or 0.5 ml/L. The amount of the nutraceutical to be added, so as to achieve the desired final concentration in the beverage (the "dosage"), is mathematically related to the initial concentration of the nutraceutical and the desired dosage. The amount of nutraceutical required to achieve the desired dosage in the final product can be calculated by standard methods known in the art.

Addition of nutraceuticals to an aqueous liquid provides a delivery vehicle for the nutraceuticals, which include pharmaceuticals and the like, wherein absorption is increased. Furthermore, binders common to many powdered formulations are eliminated, thereby speeding absorption by the body. Addition of nutraceuticals to an aqueous liquid can, under some conditions can significantly increase the effect of the nutraceutical. Moreover, hydration combined with the medical or health benefits of the nutraceutical provide the nutraceutical to the body in a simple and effective solution. Addition of nutraceuticals to a non-flavored aqueous liquid, e.g. purified water, provides the nutraceuticals in a pleasant to drink formulation that lacks caloric content and undesirable flavors. Providing a nutraceutical or medication in a non-flavored aqueous liquid form, e.g. purified water, provides an effective method of presenting formulations that in the past have been associated with undesirable flavors or tastes.

Following the addition of the nutraceutical and aqueous liquid, the container is sealed using methods known in the art. The container may be sealed so as to ensure continued sterility and/or to protect the product from alteration or contamination and/or to prevent gaseous exchange, hermetically sealed.

The final aqueous liquid or beverage preferably has no perceived off-flavors or undesirable coloration. Off-flavors comprise flavors that are undesirable in the final product. This may be based on customer perception or marketing strategy. When the final aqueous liquid is a non-flavored bottled water product the final product preferably should have no detectable flavor other than that of water and has no detectable color or particulate material.

The sealed container may then be stored, consumed immediately or further treated. For example, such further treatments include, but are not limited to; pasteurization, irradiation, refrigeration, Ultraviolet light treatment or the application of heat at least sufficient to thermally stress microorganisms.

All references, including publications, patents, and patent applications, cited herein are hereby incorporated by reference to the same extent as if each reference were individually and specifically indicated to be incorporated by reference and were set forth in its entirety herein.

While this invention has been described in certain embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A nutraceutical beverage produced by the process comprising:

forming a nutraceutical comprising forskohlin, hydroxycitric acid, and salts thereof, and fructooligosaccharides, wherein a weight of forskohlin to a weight of said hydroxycitric acid, and salts thereof, is a ratio of about 1 to about 3, and wherein a weight of said forskohlin to a weight of said fructooligosaccharides is in a ratio of about 1 to about 10;

forming a shelf-stable syrup, wherein said forskohlin, hydroxycitric acid, and salts thereof, and fructooligosaccharides are introduced into water to form said shelf-stable syrup having a dissolved solid content between about 65 and about 75 brix by weight;

heating said shelf-stable syrup to a temperature between about 138° C. and about 145° C. for between about 2 and about 8 seconds;

ozonating at least a part of a purified water to form an ozonated purified water having a dissolved ozone concentration between about 0.2 and about 0.4 mg/L;

providing a container having an internal volume at least equal to a nutraceutical volume and a purified water volume, said container including a sealable opening communicating with said internal volume;

adding said ozonated purified water to said container in the amount of said purified water volume;

adding said shelf-stable syrup to said container in the amount of said nutraceutical volume;

adding a supplemental sterilizing agent having about 0.25 to about 0.5 mg/L copper to a volume selected from the group consisting of said nutraceutical volume and said purified water volume; and sealing said sealable opening of said container, thereby providing a purified water based nutraceutical beverage.

2. The nutraceutical beverage according to claim 1, wherein said purified water comprises a final forskohlin concentration of about 100 mg/L, a final hydroxycitric acid, and salts thereof, concentration of about 300 mg/L and a final fructooligosaccharides concentration of about 1 g/L.

3. A method of adding a nutraceutical to an aqueous liquid to form a shelf-stable beverage comprising:

ozonating at least a part of said aqueous liquid to form an ozonated aqueous liquid;

providing a container having an internal volume at least equal to a pre-selected nutraceutical amount and a pre-selected aqueous liquid amount, said container including a sealable opening communicating with said internal volume;

adding said ozonated pre-selected aqueous liquid amount to said container;

adding said pre-selected nutraceutical amount to said container, wherein said nutruceutical comprises forskohlin, hydroxycitric acid, and salts thereof, and fructooligosaccharides, present in a final amount having a ratio of said forskohlin to said hydroxycitric acid, and salts thereof, of about 1:1 to about 1:3, and a ratio of said forskohlin to said fructooligosaccharides of about 1:1 to about 1:10; and sealing said sealable opening of said container.

4. The method of claim 3, wherein said aqueous liquid is chilled prior to adding ozone and comprises purified water, wherein said ozonated aqueous liquid has an ozone concentration between about 0.2 and about 0.4 mg/L, said nutraceutical comprising a shelf-stable syrup having a dissolved solid content between about 65 and about 75 brix, said method further comprising:

heating said shelf-stable syrup to a temperature between about 138° C. and about 145° C., wherein said heating is done before adding said nutraceutical to said container in the amount of said nutraceutical volume, and;

adding a supplemental sterilizing agent having a copper compound, thereby forming a shelf-stable beverage.

* * * * *